United States Patent Office 3,419,352
Patented Dec. 31, 1968

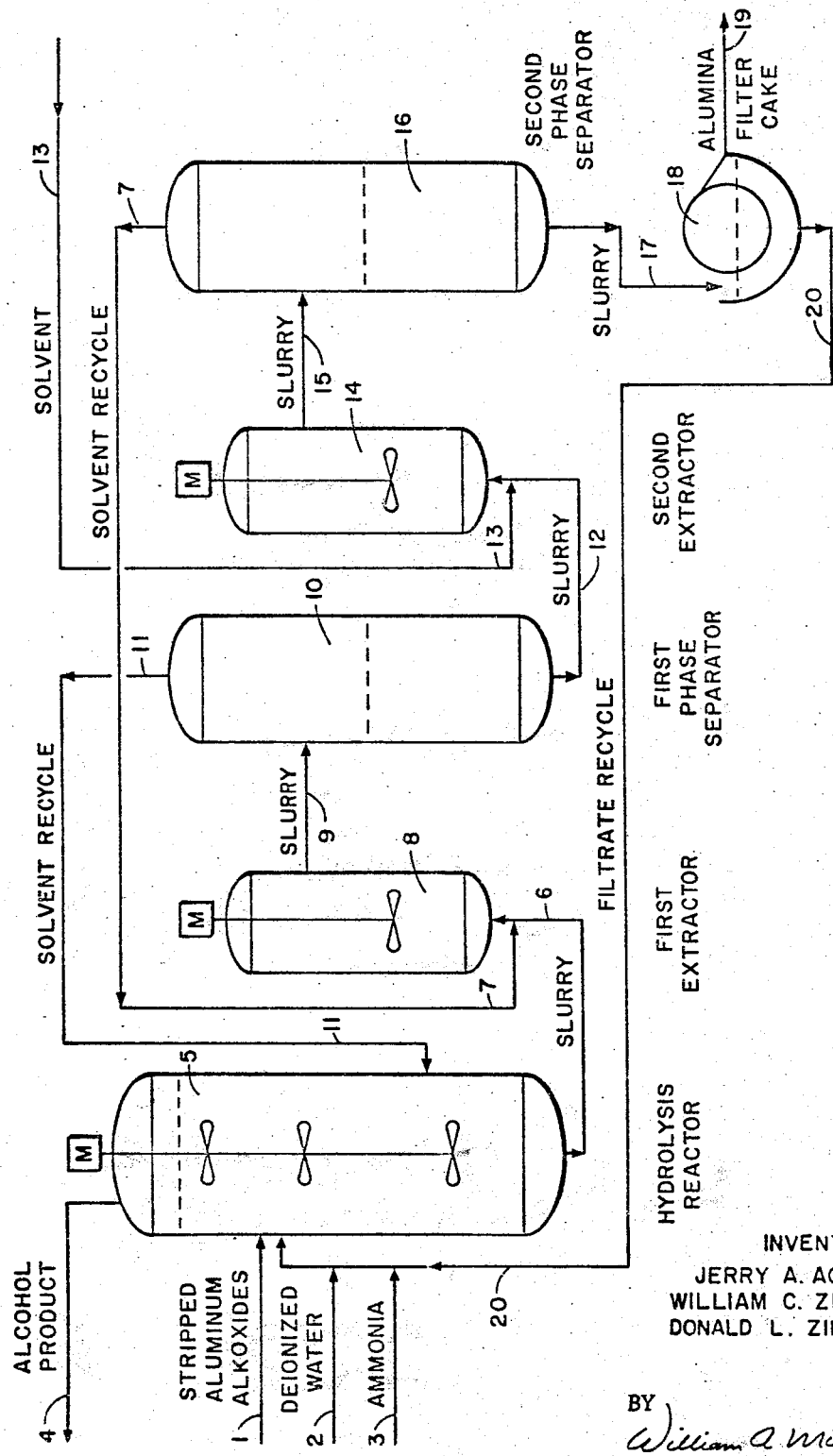

3,419,352
PROCESS FOR PRODUCING ALPHA
ALUMINA MONOHYDRATE
Jerry Anthony Acciarri and William Charles Ziegenhain,
Ponca City, Okla., and Donald L. Ziegler, Denver,
Colo., assignors to Continental Oil Company, Ponca
City, Okla., a corporation of Delaware
Filed Dec. 2, 1964, Ser. No. 415,260
3 Claims. (Cl. 23—143)

ABSTRACT OF THE DISCLOSURE

Aluminum alkoxide is hydrolyzed with water containing at least 0.25 weight percent ammonia, and a resulting aqueous phase containing alumina is subjected to solvent extraction; better separation of alumina and alcohol products, and lower product losses result.

This invention relates to a process for producing alumina by hydrolysis of aluminum alkoxide. In one aspect, the invention relates to a process for recovering by solvent extraction the alcohol adsorbed on an alpha-alumina monohydrate produced by hydrolysis of aluminum alkoxide. In another aspect, the invention relates to a process for hydrolyzing aluminum alkoxide in the presence of a specific amount of a base, and for subsequently removing adsorbed alcohol from the formed alpha-alumina monohydrate by solvent extraction. In still another aspect, the invention relates to a process for hydrolyzing aluminum alkoxide in the presence of an aqueous phase and an alcoholic phase, and for recovering alcohol, produced by the hydrolysis, from alpha-alumina monohydrate by solvent extraction of the aqueous phase.

Hydrolysis of aluminum alcoholate or alkoxide to produce the corresponding alcohol and an aluminum salt has long been known as a convenient method for preparing alumium salts of high purity. This same hydrolysis process has also been used to produce alcohols, for example by hydrolysis of aluminum alcoholates produced in the well-known growth process whereby a low molecular weight aluminum alkyl is reacted with a low molecular weight olefin to produce high molecular weight aluminum alkyls.

The actual step of hydrolyzing an aluminum alcoholate has been the subject of considerable study, whether the primary goal be recovery of aluminum salts, alcohols or both. This study has been necessitated by the notorious difficulty of producing aluminum compounds, especially the oxide or hydroxide, of a consistent quality and amenability to separation from the hydrolysis medium. For example U.S. Patent 2,636,865 to Kimberlin, issued Apr. 28, 1953, discloses a process for producing alumina-containing products which comprises introducing aluminum metal and substantially water-insoluble anhydrous alcohol and petroleum distillate into a reaction zone to react the metal and alcohol and form a solution of an aluminum alcoholate, removing the aluminum alcoholate solution from said reaction zone and mixing it with an excess of water to hydrolyze the aluminum alcoholate to form a slurry of hydrous alumina and alcohol, passing the hydrolyzed mixture to a separating zone to allow water insoluble alcohol and petroleum distillate to separate as a layer separate from the water slurry of the hydrous alumina, recovering alumina from the slurry of hydrous alumina, withdrawing separated water insoluble alcohol and petroleum distillate and drying it to remove water and recycling the dried alcohol and petroleum distillate to said reaction zone for reaction of the alcohol with an additional amount of aluminum. U.S. Patent 2,917,365 to Gilbert, issued Dec. 15, 1959, discloses the method of preparing alumina especially adapted for use as a catalyst support and consisting substantially completely of eta alumina, which comprises the steps of hydrolyzing an aluminum alcoholate solution in water containing about 0.1 to 1.0 weight percent of beta alumina trihydrate, at temperatures of from 40° F. to 200° F., the amount of water being in the range of 1 to 10 volumes per volume of alcoholate solution, agitating the resultant mixture for about 30 minutes, without substantial aging, separating the beta alumina trihydrate slurry formed, drying and heating the alumina to a temperature in the range of 250°–1250° F. to further dehydrate it. U.S. Patent 2,970,892 to Kirshenbaum et al., issued Feb. 7, 1961, discloses the method of preparing alumina especially adapted for use as a catalyst support which comprises preparing a solution of an aluminum alcoholate in a liquid hydrocarbon solvent, slowly adding said solution of aluminum alcoholate to an aqueous solution of ammonia containing about 1.8 to 3.4 wt. percent $NH_3$ while vigorously stirring said aqueous solution, the amount of aqueous ammonia utilized being in the range of about 1 to 10 volumes per volume of alcoholate and the temperature of said aqueous ammonia being in the range of 50 to 200° F., aging the hydrous alumina slurry in the resultant aqueous layer at a temperature below about 80° F. for periods of from one hour to five days to convert the hydrous alumina to beta alumina trihydrate, said aging time being near one hour when hydrolysis is effected at temperatures in the lower part of the temperature range and the aging time being about four to five days when hydrolysis is effected at temperatures in the upper part of said range, separating the hydrous alumina from the excess water and drying to remove the ammonia and aqueous medium, and thereafter heating the hydrous alumina to a temperature in the range of 400–1400° F. to dehydrate it to an adsorptive alumina which is predominantly in the eta phase and which contains more than 40% of its total pore volume in macropores or pores with diameters between 0.05 and 1.0 micron. Among the problems in the hydrolysis process are: inability to consistently produce, on a commercial scale, the desired structural type of alumina; difficulty in recovering alcohols adsorbed or absorbed by the alumina; and poor filtration rates due to alumina floc formation.

Accordingly, it is an object of this invention to provide a process for hydrolyzing aluminum alcoholates wherein carry-over of alumina in the alcohol product stream is substantially reduced, producing purer alcohol with lower alumina losses.

It is another object of the invention to provide an aluminum alcoholate hydrolysis process wherein alpha-alumina monohydrate can be consistently produced.

It is a further object of this invention to provide an aluminum alkoxide hydrolysis process wherein the produced alumina is amenable to ready separation from the hydrolysis medium.

Other aspects, objects and the several advantages of this invention will become apparent upon study of this disclosure, including the appended claims and the drawing, in which the sole figure is a schematic representation of a presently preferred embodiment of this invention.

According to the invention, aluminum alkoxides are hydrolyzed by being introduced into a reaction zone along with water and a controlled minor amount of ammonia, the ratio of alkoxide to water being such as to maintain two liquid phases. The resultant slurry of alumina, alcohol and water is then subjected to countercurrent extraction and settling phase separation with a lower alcohol extraction medium. In one embodiment of the invention, the extraction of the aqueous hydrolysate phase is effected in at least two contacting stages with intermediate and final phase separation of the aqueous raffinate and alcoholic extract phases.

Reference is now made to the drawing for a more complete understanding of the invention. Alkoxide feed stream 1 can advantageously comprise an oxidized growth product, the preparation of which is described, for example, in U.S. Patent 3,070,616 to Flanagan, issued Dec. 25, 1962. Other sources of aluminum alkoxide are, of course, suitable. Water, preferably deionized, for hydrolysis is introduced into reactor 5, along with the alkoxide feed. Water stream 2 contains a critical amount of ammonia introduced by way of conduit 3. The ratio of streams 1 to 2 is controlled so as to maintain two liquid phases in reactor 5, an aqueous and an alcoholic. A lower alcohol such as butanol, from extraction as will be described, enters reactor 5 by way of conduit 11. Reactor 5 is equipped with agitation means such as a motor driven impeller and/or propellers. Alcohol product from hydrolysis, along with the extraction alcohol, is removed from the upper portion of the reactor by way of conduit 4. A slurry comprising alumina with occluded alcohol in water is withdrawn by way of conduit 6, mixed with extraction medium to be later described via conduit 7, and introduced into a first extraction zone 8. Extractor 8 contents are preferably vigorously agitated. A slurry of alumina, water and extraction medium is withdrawn from extractor 8 and passed by way of conduit 9 to a first phase separator 10, which is maintained quiescent. The alcohol phase, which comprises extraction medium plus product alcohol formerly occluded on the alumina, is withdrawn from an upper region of settler 10 and passed by way of conduit 11 to the hydrolysis reactor. An aqueous slurry of alumina with small amounts of alcohol is withdrawn from a lower region of settler 10 and passed by way of conduit 12 into admixture with feed extraction medium from conduit 13. Although not shown, it is obvious that alcohol product stream 4 can be fractionated to recover extraction medium for recycle to conduit 13. The thus-admixed stream of fresh extraction medium and alumina in water is introduced into a second extractor vessel 14, similar to vessel 8, and also preferably vigorously agitated. The material is passed by way of conduit 15 to a second phase separator 16, similar to 10. Extraction medium plus recovered alcohol is withdrawn from an upper portion by way of conduit 7 and recycled to first extractor 8. A slurry of alumina in water is withdrawn from a lower region by way of conduit 17 and passed to a separation means 18, such as a filter. Purified and separated alumina product is withdrawn by way of conduit 19, and can be suitably dried and/or calcined for the desired end use. Aqueous medium is withdrawn by way of conduit 20, and can be recycled to hydrolysis reactor 5. Requisite heaters, coolers, pumps, valves, etc., are not shown.

The invention will be further illustrated by the following examples.

EXAMPLE 1

In this example, hydrolysis and extraction were effected in the same vessel, which comprised a vertical 6-inch diameter pipe 29.5 feet high. This apparatus was not that shown in the figure. Alkoxide feed and water were introduced in a zone from 15 to 49 inches from the top; this zone comprised the reaction section, and was agitated and baffled as footnoted on the runs. The pipe volume below the reactor section was an extraction zone by virtue of ethanol solvent being introduced near the bottom of the pipe. A slurry of alumina in extraction medium was withdrawn from the bottom, and product alcohol plus extraction ethanol was withdrawn from the top. The ratio of water to alkoxide to solvent was varied to demonstrate the dependence of alumina loss in overhead alcohol product on feed ratio. In runs 4–15, there were maintained two liquid phases, an aqueous and an alcoholic, with the alumina being removed from the bottom of the extraction zone as an aqueous slurry. In runs 30–49, there was present only a single liquid phase, alcoholic, with alumina product being removed as a slurry in alcohol.

TABLE 1

| Run Number | Alkoxide Feed Rate, Lb./Hr. | Agitator, r.p.m. | Weight Ratios | | | Solvent [2] | Temperatures, °F. | | | Percent Al₂O₃ Loss [1] in Alcohol Product | Footnote Remarks |
| --- | --- | --- | --- | --- | --- | --- | --- | --- | --- | --- | --- |
| | | | Water | Alkoxide | Solvent | | Alkoxide Feed | Reaction Section | Extraction Section | | |
| 4 | 60.0 | 120 | 0.914 | 1.00 | 0.832 | B | 145 | 140 | 140 | 1.16 | (4) |
| 6 | 67.0 | 70 | 0.850 | 1.00 | 1.025 | B | 140 | 140 | 150 | 0.44 | (5) |
| 8 | 61.0 | 70 | 1.030 | 1.00 | 1.192 | B | 212 | 210 | 222 | 1.13 | (5) |
| 11 | 59.0 | 40 | 0.981 | 1.00 | 0.954 | B | 212 | 206 | 200 | 0.75 | (5) |
| 12 | 62.0 | 45 | 0.790 | 1.00 | 0.900 | B | 212 | 205 | 190 | 0.28 | (4) |
| 15 | 61.0 | 175 | 0.657 | 1.00 | 0.989 | A | 140 | 158 | 138 | 0.37 | (5) |
| 30 | 60.0 | 25–30 | 0.309 | 1.00 | 0.989 | A | 140 | 175 | 165 | 70.1 | (3) |
| 31 | 51.1 | 40 | 0.307 | 1.00 | 0.468 | A | 137 | 180 | 150 | 54.7 | (3) |
| 32 | 52.8 | 89 | 0.453 | 1.00 | 1.068 | A | 165 | 175 | 150 | 27.1 | (4) |
| 33 | 63.5 | 193 | 0.639 | 1.00 | 1.172 | A | 170 | 170 | 155 | 48.1 | (4) |
| 34 | 49.0 | | 0.573 | 1.00 | 1.191 | B | 190 | 180 | 160 | 17.2 | (4) |
| 34-1 | 49.0 | | 0.573 | 1.00 | 1.191 | B | 190 | 180 | 160 | 46.1 | (4) |
| 35 | 56.0 | | 0.398 | 1.00 | 0.858 | B | 195 | 190 | 160 | 37.6 | (4) |
| 39 | 57.0 | 25 | 0.461 | 1.00 | 1.400 | A | 160 | 167 | 153 | 42.4 | (4) |
| 40 | 27.0 | 85 | 1.096 | 1.00 | 3.200 | A | 160 | 150 | 145 | 20.8 | (4) |
| 43 | 49.6 | 8 | 0.550 | 1.00 | 1.592 | A | 164 | 187 | 170 | 2.84 | (3) |
| 44 | 43.1 | | 0.566 | 1.00 | 1.825 | B | 162 | 165 | 140 | 4.02 | (3) |
| 45 | 43.8 | 8–10 | 0.723 | 1.00 | 2.047 | B | 156 | 165 | 140 | 14.3 | (3) |
| 48 | 45.5 | 8–10 | 0.700 | 1.00 | 2.191 | A | 155 | 170 | 155 | 3.06 | (3) |
| 49 | 58.9 | | 0.623 | 1.00 | 1.975 | A | 165 | 172 | 140 | 6.27 | (3) |

[1] Percent of total alumina produced in hydrolysis that goes out with the alcohol product.
[2] A=93.8 weight percent ethanol, 6.2 weight percent water. B=84.1 weight percent ethanol, 11.1 weight percent methanol, 4.8 weight percent water.
[3] The reaction section contained paddle agitators over the screens. Screen openings varied from 2.5 to 11.0 mm.
[4] The reaction section contained two opposing turbine agitators with aluminum alkoxide and water being fed between them.
[5] The reaction section contained paddle agitators but no screens.

It can be seen from the preceding runs that operation with the reaction zone containing a single liquid alcoholic phase in runs 30–49 resulted in high losses of alumina carried overhead in the alcohol product. In such an instance, valuable alumina product is lost, and when the alcohol product is subjected to any subsequent heating such as distillation, the alumina contaminant catalyzes dehydration of the alcohols to olefins and also causes fouling of heat transfer surfaces. In contrast, control of feed ratios to maintain two liquid phases, aqueous and alcoholic (runs 4–15) substantially reduces carry-over, since the alumina prefers the aqueous phase.

EXAMPLE 2

Additional runs were made in the apparatus of Example 1 in which the extraction zone was operated first as an aqueous phase saturated with n-butanol extraction medium (runs 18–20) and then as an n-butanol phase saturated with water (runs 21–22). From these runs it can be seen that loss of alcohol by occlusion on alumina product is lower in the first than the second instance.

TABLE 2

| Run Number | Alkoxide Feed Rate, Lb./Hr. | Weight Ratios | | | Temperatures, °F. | | | Percent Alcohol Recovery[1] |
|---|---|---|---|---|---|---|---|---|
| | | Water | Alkoxide | n-Butanol | Alkoxide Feed | Reaction Zone | Extraction Zone | |
| 18 | 59.0 | 1.380 | 1.00 | 0.677 | 140 | 180 | 150 | 99.54 |
| 19 | 60.0 | 1.375 | 1.00 | 0.466 | 140 | 185 | 150 | 99.25 |
| 20 | 60.0 | 1.498 | 1.00 | 1.540 | 135 | 170 | 150 | 99.40 |
| 21 | 62.0 | 1.316 | 1.00 | 0.254 | 140 | 175 | 130 | 98.79 |
| 22 | 59.0 | 1.373 | 1.00 | 0.799 | 138 | 160 | 130 | 98.21 |

[1] Percent of total alcohols formed in reaction zone that are recovered as product alcohol in overflow stream from clarification zone.

This indicates that the interface between the aqueous and the alcohol phases should be maintained above, rather than below, the extraction section, since the alumina fed into the extraction section from hydrolysis apparently does not readily pass the alcohol-water interface.

The following examples illustrate the effect of hydrolysis water pH upon the recovery of alumina and alcohols and the filterability of the alumina. These runs were made in the apparatus of the figure.

EXAMPLE 3

This run was made with acidic deionized water feed (pH=3.35) such that the aqueous alumina slurry leaving the hydrolysis reactor was also acidic (pH=6.1). The process was completely inoperable and filtration of the alumina slurry was impossible.

EXAMPLE 4

This run was made using neutral (pH=7.0) deionized feed water. Under these conditions, the aqueous alumina slurry leaving the hydrolysis reactor was basic (pH=7.8). The maximum filtration rate possible on the rotary vacuum drum filter was 35 pounds filter cake per hour per square foot filtering area. Because of the butanol-water-alumina emulsions formed in the extractors, product alcohol recovery was very low (98.56%). The presence of this emulsion makes operation of the phase separators very difficult. Upon recycling the filtrate to the hydrolysis reactor, this same emulsion causes thickening of the alumina slurry, causing a shutdown in the process.

EXAMPLE 5

This run was similar to Example No. 4 but with the addition of 0.125 weight percent ammonia to the fresh deionized water feed. The filtration rates were not improved over Example No. 4. The emulsions between butanol-water-alumina were again present but not as bad as the emulsions present in Example No. 4. The alcohol recovery was improved (99.59%) over Example 4 because of lesser emulsification. Recycle of the filtrate, however, to the hydrolysis reactor caused the same shutdown problems explained in Example 4.

EXAMPLE 6

This run used 0.25 weight percent ammonia in the fresh deionized feed water. With this addition, all emulsification problems disappeared, filtration rates increased to 60 pounds filter cake per hour per square foot filtering area, and alcohol recovery increased to 99.65 percent or greater. Recycle of filtrate (no emulsion now present) to the hydrolysis reactor caused no operational problems whatsoever.

EXAMPLE 7

This run was a repeat of Example No. 6, but using only filtrate recycle as the source of hydrolysis water, 0.25 weight percent ammonia being added to the filtrate recycle before entering the hydrolysis reactor. This is a very severe test on the operation of the process because even small amounts of water-butanol-alumina emulsions in the filtrate recycle would cause thickening of the alumina slurry and shutdown of the process.

The operation of the process was extremely smooth with similar results obtained as in Example No. 6.

EXAMPLE 8

This run was similar to Example No. 6, but with 0.375 weight percent ammonia added to the fresh deionized water feed to the hydrolysis reactor. Adding this excess ammonia (excess over 0.25 weight percent) neither aided nor harmed the process operations.

It can be seen from the preceding Examples 3–8 that the hydrolysis water feed pH is critical to proper operation of the process, and that this water preferably is deionized and then has added to it at least about 0.25 weight percent ammonia.

The following table summarizes the conditions prevailing during Examples 3–8.

TABLE 3

| Example Number | 3 | 4 | 5 | 6 | 7 | 8 |
|---|---|---|---|---|---|---|
| Aluminum Alkoxides Feed Rate, lb./hr. (1) | 150 | 150 | 150 | 150 | 150 | 150 |
| Weight Ratio: | | | | | | |
| Feed Water (2)/alkoxide (1) | 1.5 | 1.42 | 1.72 | 1.5 | 1.5 | 1.5 |
| Butanol (13)/alkoxide (1) | 0.67 | 0.67 | 0.67 | 0.67 | 0.67 | 0.67 |
| Temperatures, °F.: | | | | | | |
| Hydrolysis Reactor (5) | 220 | 225 | 240 | 225 | 234 | 234 |
| 1st Extractor (8) | 200 | 220 | 224 | 210 | 225 | 225 |
| 1st Phase Separator (10) | 200 | 220 | 224 | 210 | 210 | 210 |
| 2nd Extractor (14) | 195 | 210 | 218 | 205 | 210 | 210 |
| 2nd Phase Separator (16) | 195 | 210 | 218 | 205 | 205 | 205 |
| Filter (18) | 185 | 150 | 165 | 160 | 140 | 140 |
| Pressures: | | | | | | |
| Hydrolysis Reactor (5), p.s.i.g | 60 | 58 | 60 | 47 | 49 | 50 |
| 1st Extractor (8), p.s.i.g | 30 | 38 | 30 | 25 | 32 | 20 |
| 1st Phase Separator (10), p.s.i.g | 28 | 36 | 28 | 25 | 31 | 20 |
| 2nd Extractor (14), p.s.i.g | 25 | 33 | 24 | 20 | 22 | 15 |
| 2nd Phase Separator (16), p.s.i.g | 23 | 31 | 20 | 19 | 21 | 14 |
| Filter (18): | | | | | | |
| Cake Forming, in. Hg | 13 | 20 | 13 | 15 | 15 | 13 |
| Cake Drying, in. Hg | 8 | 15 | 8 | 10 | 10 | 10 |
| Weight Percent $Al_2O_3$ in.— | | | | | | |
| Alcohols (4) | | 0.01 | 0.003 | 0.02 | 0.02 | 0.01 |
| Filter Cake (19) | | 13.4 | 14.7 | 14.7 | 14.4 | 15.1 |
| Filtrate Recycle (20) | | 0.18 | 0.08 | 0.09 | 0.09 | 0.26 |
| Lbs. $NH_3$ (3)/100 lbs. Feed Water (2) | 0 | 0 | 0.125 | 0.25 | 0.25 | 0.375 |
| pH Feed Water (2) | 3.35 | 7.0 | 11.0 | 11.1 | 11.1 | 11.2 |
| pH Slurry to Filter (17) | 6.1 | 7.8 | 10.2 | 10.2 | 10.2 | 10.5 |
| pH Filtrate (20) | | 7.8 | 9.8 | 10.4 | 10.2 | 10.25 |
| Filtration Rate, lb. cake/(hr. x ft.²) | 0 | 30–35 | 30–35 | 50–60 | 50–60 | 50–60 |
| Percent Ultimate Alcohol Recovery | | 98.56 | 99.59 | 99.65 | 99.77 | 99.77 |
| Emulsification of Butanol-Water Slurry (12, 17) | No | Yes | Partial | No | No | No |

The following example is a material balance on the process of the figure.

EXAMPLE 9

Material Balance Basis: 100 lbs. alkoxide.
Hydrolysis Temperature: 230° F.
Hydrolysis Pressure: 60 p.s.i.a.
Hydrolysis Rate: 437.5 lb. alkoxide per hr. per ft.$^2$.
Filtration Rate: 39.5 lb. filter cake per hr. per ft.$^2$ (filter not loaded).
Filtration Unit: Dorr-Oliver 1 ft. x 1 ft. rotary vacuum filter.
Filter Cloth: 133 Micron opening monofilament polypropylene.
Filtration Temperature: 180° F.
Filtration Vacuum: 13 in. Hg.

133 micron mesh filter cloth, filtration rates of at least about 50 lb. cake/hr.-ft.$^2$ can be obtained.

Although ethanol and butanol have been the main extraction solvents discussed, it is obvious that other solvents will function. It has been found that the type of solvent used for extraction has an effect upon the physical nature of the alumina product, i.e., alumina from an ethanol extraction appears to be slightly more filterable than does that from a butanol extraction. The use of n-butanol is presently preferred because it is available by fractionation of the product alcohol stream, it has a relatively low solubility in water, and it yields a readily filterable alumina. However, other extraction media such as esters, ethers, aldehydes, ketones and paraffins, all of low molecular weight, can be used. When using a solvent type other than an alcohol, separation of the solvent from the alcohol

| Stream Number | Component Name | Alk-oxide, lb. | Water, lb. | Butanol, lb. | Alcohol Prod., lb. | Alumina, lb. | Total Wt., lb. | Percent of Theoretical Alcohol Product Lost |
|---|---|---|---|---|---|---|---|---|
| (1) | Alkoxide Feed | 100.00 | | | | | 100.00 | |
| (2) | Water Feed $^1$ | | 89.5 | | | | 89.5 | |
| (4) | Alcohol Product | | 16.8 | 50.12 | 89.65 | 0.03 | 156.6 | |
| (6) | Reactor Slurry | | 128.67 | 8.51 | 5.0 | 11.92 | 154.10 | |
| (7) | Recycle Butanol | | 20.4 | 49.24 | 1.45 | 0.01 | 71.1 | |
| (9) | Slurry | | 149.07 | 57.75 | 6.45 | 11.93 | 225.2 | |
| (11) | Recycle Butanol | | 17.8 | 51.14 | 4.75 | 0.01 | 73.7 | |
| (12) | Decanter Slurry | | 131.27 | 6.61 | 1.70 | 11.92 | 151.5 | |
| (13) | Butanol Feed | | | 64.5 | | | 64.5 | |
| (15) | Slurry | | 131.27 | 71.11 | 1.70 | 11.92 | 216.0 | |
| (17) | Decanter Slurry | | 110.87 | 21.87 | 0.25 | 11.91 | 144.9 | |
| (19) | Filter Cake | | 59.7 | 9.87 | 0.25 | 11.78 | 81.6 | 0.28 |
| (20) | Recycle Filtrate | | 44.37 | 3.0 | | 0.13 | 47.5 | |
| | Filtrate Loss | | 6.8 | 9.0 | | | 15.8 | |

$^1$ Includes 0.25 lb. NH$_3$ per 100 lb. deionized H$_2$O.

Preferred hydrolysis reaction conditions are about 200 to about 330° F., more preferably about 230° F., with pressure sufficient to maintain liquid phase. Pressure will, of course, vary with the type of extraction solvent used and with reaction temperature; for n-butanol solvent at the preferred temperature, about 60 p.s.i.g. pressure suffices. When operating according to the specified reaction conditions, the alumina has been shown to be consistently essentially entirely alpha-alumina monohydrate. Other preferred process conditions include ratio of water to alkoxide feed, preferably about 1.0 to 3.0 pounds per pound, more preferably about 1.4 pounds per pound. Residence time in the hydrolysis reactor appears to have little effect on the process, but is preferably at least about 1 minute. Extraction temperature and pressure will depend upon the extraction solvent being used; in the case of buantol, best extraction efficiency is obtained between about 180 and 230° F., preferably about 200° F., at a pressure about 15 and 30 p.s.i.g., preferably about 20 p.s.i.g. Extraction zone residence time will depend in a large degree upon design of the zone, including agitation efficiency, but preferably will be at least about 2 minutes, more preferably at least about 4 minutes. The ratio of extraction solvent to alumina in the extraction zones will also depend upon the type of solvent used; in the case of butanol, the ratio is preferably at least about 2.0 on a weight basis, and more preferably at least about 4.8. Conditions in the phase separator can be readily determined, and will depend upon physical configuration. Operable conditions of temperature, pressure and residence time are about 180–220° F., preferably about 200° F., about 13–28 p.s.i.g., preferably about 18 p.s.i.g., and about 3–50 minutes, preferably at least about 5 minutes. These conditions will enable maintaining an alcohol loss on the alumina of below about 0.25 weight percent of total alcohol. Filtration of the aqueous slurry of alumina is best carried out about 160° F., preferably at about 180° F. When using a product can present a problem. The two requisites of the solvent are that it be selective to alcohols in the presence of water, and that it is capable of forming two liquid phases, a solvent-rich phase and a water-rich phase. Other solvents include methanol, n-hexanol, i-propanol, t-butanol, dimethylsulfoxide, acetone, methylisobutyl ketone, diethyl ether, acetaldehyde, n-pentane and ethyl acetate.

As mentioned, suitable alkoxide feed includes oxidized growth product. Such material normally comprises trialkoxy aluminum in which the alkyl groups range in carbon content from 2 to about 30 each. In the event of some diluent being present with the oxidized growth product from its prior processing, the diluent is preferably first stripped from the alkoxides in order that it does not interfere with the present extractions. Other sources of aluminum alkoxides are, of course, amenable to treatment by the process of this invention.

While particular embodiments of the invention have been described, it will be understood, of course, that the invention is not limited thereto, since many modifications may be made; and it is, therefore, contemplated to cover by the appended claims any such modifications as fall within the true spirit and scope of the invention.

What is claimed is:
1. In a process for preparing alpha alumina monohydrate wherein
  (a) a stream containing aluminum alkoxide, each alkoxide radical containing from 2 to about 30 carbon atoms, is passed to a reaction zone;
  (b) a stream of water in amount sufficient to maintain in said zone two liquid phases, a water-rich phase and an alcohol-rich phase, is also passed to said reaction zone;
  (c) there is withdrawn from an upper region of said zone a product comprising said alcohol-rich phase;
  (d) there is withdrawn from a lower region of said zone said water-rich phase now containing solid alpha alumina monohydrate;

(e) said water-rich phase is contacted with a solvent, selective for product alcohol and capable of forming a non-aqueous phase in the presence of water, in proportion to form two liquid phases;

(f) there is withdrawn from said contacting an alcohol-enriched solvent phase;

(g) there is also withdrawn from said contacting a water-rich phase containing alpha alumina monohydrate; and (h) alpha alumina monohydrate product is separated from said withdrawn water-rich phase of step (g);

the improvement comprising incorporating in said water of step (b) from about 0.25 to 0.375 weight percent ammonia.

2. The process of claim 1 wherein said solvent comprises an alcohol of up to about 6 carbon atoms.

3. The process of claim 2 wherein said solvent comprises n-butanol.

References Cited

UNITED STATES PATENTS

| | | | |
|---|---|---|---|
| 2,636,865 | 4/1953 | Kimberlin. | |
| 2,805,920 | 9/1957 | Richardson | 23—143 |
| 2,903,418 | 9/1959 | Kirshenbaum et al. | 23—143 X |
| 2,917,365 | 12/1959 | Gilbert | 23—143 |
| 2,970,892 | 2/1961 | Kirshenbaum et al. | |
| 3,019,080 | 1/1962 | Vincent | 23—143 |
| 3,255,256 | 6/1966 | Miller | 260—448 X |
| 3,264,063 | 8/1966 | Carter | 23—143 |
| 3,309,416 | 3/1967 | Poe et al. | 260—448 X |
| 3,357,791 | 12/1967 | Napier | 23—143 |

EARL C. THOMAS, *Primary Examiner.*

G. T. OZAKI, *Assistant Examiner.*

U.S. Cl. X.R.

260—448